United States Patent [19]

Gacki et al.

[11] E Re. 30,610

[45] Reissued May 12, 1981

[54] FLUID MIXING AND DISPENSING SYSTEM

[75] Inventors: Leonard W. Gacki, White Plains; Robert E. Daly, Farmingdale, both of N.Y.

[73] Assignee: Picker Corporation, Cleveland, Ohio

[21] Appl. No.: 10,812

[22] Filed: Feb. 9, 1979

Related U.S. Patent Documents

Reissue of:

[64] Patent No.: 4,103,358
Issued: Jul. 25, 1978
Appl. No.: 609,957
Filed: Sep. 3, 1975

[51] Int. Cl.[3] ..... B01F 15/02; B01F 15/04

[52] U.S. Cl. ..... 366/153; 137/101.27; 222/86; 354/323; 366/167; 366/177

[58] Field of Search ..... 366/329, 191, 132, 153, 366/150, 151, 152, 153, 160, 162, 166, 167, 177, 182; 222/80, 545, 83, 82, 63, 86, 83.5, 57, 85, 81, 132, 133; 137/101.25, 101.27; 141/18; 4/228; 354/323, 328

[56] References Cited

U.S. PATENT DOCUMENTS

| | | | |
|---|---|---|---|
| 623,307 | 4/1899 | Davis | 366/329 |
| 689,799 | 12/1901 | Graves | 366/191 |
| 1,657,782 | 1/1928 | Berg | 222/80 |
| 1,925,466 | 9/1933 | Simpson | 222/545 |
| 2,024,208 | 12/1935 | Deschner | 222/83 |
| 2,278,723 | 4/1942 | Malsbary | 4/228 |
| 2,774,393 | 12/1956 | Swan | 141/18 |
| 2,899,106 | 8/1959 | Weinert | 222/82 |
| 2,907,495 | 10/1959 | Brous | 222/63 |
| 2,939,381 | 6/1960 | McBride | 99/295 |
| 3,131,831 | 5/1964 | Dorchak | 222/86 |
| 3,133,726 | 5/1964 | Tarukawa | 366/132 |
| 3,139,343 | 6/1964 | Baselt | 222/83.5 |
| 3,326,531 | 6/1967 | Matheson | 222/86 |
| 3,345,997 | 10/1967 | Miller | 137/101.25 |
| 3,367,353 | 2/1968 | Hunter | 137/101.31 |
| 3,638,833 | 2/1972 | Lucas | 222/57 |
| 3,705,598 | 12/1972 | Ray | 137/101.25 |
| 4,002,267 | 1/1977 | Aelerman | 222/1 |

OTHER PUBLICATIONS

Kodak Research Disclosure, Oct. 1973, Dispensing Apparatus 11440.

Operating Instructions for the Kodak Supermatic 8 Processor and Flow Chart, Jun. 1974.

*Primary Examiner*—Robert W. Jenkins

*Attorney, Agent, or Firm*—Watts, Hoffmann, Fisher & Heinke Co.

[57] ABSTRACT

A fluid mixing system and method is disclosed for automatically mixing precise concentrations of photographic processing chemistry to be used in an X-ray film processor. The system produces a fresh batch of mixed solution whenever a previous batch has been reduced to a predetermined minimum volume. A pair of substantially identically constructed mixing units are provided to produce both developer and fixer solutions for film processing. Each unit has: a chemical supply structure for supplying chemicals from containerized supplied; a storage and mixing tank structure which underlies the chemical supply structure and defines a reservoir for mixing the chemistry with water; a water input valve for selectively introducing water under pressure into the tank structure; control apparatus for conditionally controlling operation of the water valve; and a chemical release assembly which is coupled to and actuated by the water valve. The chemical release assembly is operated by the pressure of the water as the water is admitted through the water valve. Operation of the release assembly causes piercing of the containers, allowing the chemistry to drain into the reservoir. The pressurized water creates a swirl for agitating and thoroughly mixing the chemistry and the water.

50 Claims, 17 Drawing Figures

FLUID MIXING AND DISPENSING SYSTEM

Matter enclosed in heavy brackets [ ] appears in the original patent but forms no part of this reissue specification; matter printed in italics indicates the additions made by reissue.

REFERENCE TO PATENT

"Film Processor," U.S. Pat. No. 3,418,913, issued Dec. 31, 1968 to J. L. Snarr (the FILM PROCESSOR patent).

FIELD OF THE INVENTION

The present invention relates generally to a method and apparatus for mixing fluids and more particularly relates to a chemical mixing and dispensing system for mixing developer and fixer solutions and then dispensing them to an X-ray film processor.

BACKGROUND OF THE INVENTION

When a medical diagnosis is accomplished with X-ray examination, it is often desirable to complete the examination during a single visit of a patient to a diagnostic X-ray room. Recall of a patient to repeat or supplement an examination is undesirable for a number of reasons. They include (a) time lost in obtaining the information necessary for proper medical diagnosis where time can be of the essence; (b) repetition of some procedures such as catheter insertion can be dangerous; (c) patient discomfort which can be quite acute if the patient is severely ill; and, (d) inefficient utilization of X-ray equipment.

With modern medical diagnostic procedures it is not uncommon to develop and preliminarily examine a radiograph while a patient remains at an exposure station in a diagnostic X-ray room. This permits the attending physician to be satisfied that a given X-ray examination procedure has been successfully completed or alternatively must, for some reason, be augmented by taking further radiographs.

If radiographs are to be inspected while a patient remains at an exposure station, fast film processing has come to be considered a virtually necessary part of medical X-ray diagnostic procedures. To achieve high rates of processing, film processors have been developed which automatically process the exposed sheet of film by mechanically feeding the sheet of film in sequence through the baths of developer and fixer solutions, then washing and drying it. The time required for completely processing a radiograph is of the order of one-half minute or less. An improved film processor of this type is described in the reference FILM PROCESSOR patent.

Chemicals which perform the developing and fixing are consumed by use. With manual film processing, a skilled technician can compensate for depletion in solution concentrations by retaining films in the solutions for longer periods of time. With automatic processors, on the other hand, processing times are substantially constant and as a consequence, if solution concentrations are allowed to become depleted, the inevitable result is poor quality.

Accordingly, providing fast film processing of the requisite high quality and at the high volumes which are often encountered in busy hospitals depends on the provision of fresh, clean, and properly mixed chemicals. As the sheets of the film are transported through the baths, solution is carried away by the sheets and chemicals are consumed. Thus, fresh chemicals are required if desired processing quality is to be maintained and replenishment is a necessity.

With the processor of the FILM PROCESSOR patent, replenishing quantities of developer and fixer solutions are supplied automatically during processing of film on an as-needed basis.

The developer and fixer solutions have relatively short shelf-lives; accordingly, it is desirable to mix the developer and the fixer solutions (1) near the location of the film processor and (2) at times immediately prior to the demand for them by the film processor.

PRIOR ART

In hospitals and clinics it is quite common for an attendant to mix the developer and fixer solutions manually. In this manual procedure the operator pours measured amounts of the chemical components and water into a mixing tank and then manually agitates the solution.

Manual mixing procedures have several drawbacks. Errors in proportioning the chemistry are common, resulting in mixed solutions which produce film images of inferior quality. Manual mixing is slow and messy and attendants dislike the task. In addition, to avoid improper, or actual stoppage of, film processor operation, an attendant must maintain vigilance over the supplies of replenishment fluid in storage tanks to assure that the mixed solutions in the tanks will not become depleted.

In an attempt to alleviate these problems, the prior art has proposed chemical mixing systems which were intended to automatically mix developer and fixer solutions in proper concentrations and to dispense them to one or more film processors. The proposed automatic mixing systems were attempts to assure that the mixed solutions were fresh and did not become depleted before new solution was prepared.

One proposed automatic mixing system for X-ray film processing chemistry provided several reservoirs for holding chemical concentrates. Each reservoir was connected to a water flow passage through a venturi tube. Theoretically, as water flowed through the venturi, a predetermined amount of each chemical concentrate would be drawn into the water provide the and mixed to provide the desired solution.

This venturi-type prior art mixing system did not consistently provide results which were acceptable for clinical use, presumably because the functioning of the venturi was excessively effected by such variables as water flow rates and pressures, and the pressure heads in the reservoirs. Accordingly, this proposal did not consistently provide the required chemical proportions in the processing solutions.

Another mixing and dispensing apparatus for photographic film processing solutions has been proposed which was constructed similarly to the described venturi system except that solenoid operated valves replaced the venturi tubes. This system suffered from deficiencies similar to those described for the venturi system and was unable, reliably, to produce solutions of sufficiently consistent concentrations over extended periods of time. Not only did the opening and closing of the valves produce an error factor, but the flow of chemical concentrate through each valve was not sufficiently constant.

There have been other proposals for mixing and dispensing solutions for applications having requirements differing from the X-ray film processing. Some have been for high volume, commercial applications where there is a steady demand for replenishment. These proposals have not been suitable for clinical applications which require small batches of solution at intermittent intervals. One proposed high volume mixing system utilized a pair of large volume, mixing and holding tanks for each final solution. The mixing tank provided a large volume reservoir in which the chemicals and the water were mixed. The holding or accumulator tank provided large volume storage into which a complete batch of mixed solution was transferred after mixing. The solution was dispensed from the accumulator tank on a demand basis. As the solution was dispensed, a new batch of solution was prepared in the mixing tank. After the accumulator tank has emptied to a predetermined minimum level, it was replenished from the mixed solution in the mixing tank.

The large volume tanks created problems. Pumps were usually employed for transporting the solution between the mixing system and the film processor. The large volume tanks tended to produce unduly large and varying head pressures on the pumps. This was a disadvantage which, unless special procedures, such as pressure sensing switches and valves were employed, caused an uneven flow of solution. As previously mentioned, an uneven flow would cause variations in the strength of processing solutions, resulting in films of inferior quality.

The large volume tanks used in these high volume automatic mixing systems, in order to accommodate consistently high replenishment requirements, are simply unsuitable for many clinical applications. Clinical replenishment requirements vary both from one hospital to another and from day to day. There is, accordingly, a large variation in the number and size of the radiographs required for any given time period.

To meet the possibility that the frequency at which radiographs are produced may be high, a chemical mixing system suitable for clinical use must have the capability to replenish at a high rate. On the other hand, low and intermittent usages of radiographic film processors is common resulting in periods when there is little or no demand for replenishment of solution. Mixed solution gradually degrades in quality due to oxidization. This oxidation changes the chemical composition of the solution and results in the production of films of inferior quality. Accordingly, where usage is low or intermittent, it is desirable to have only minimum volumes of mixed replenishment solution.

Thus, for clinical use, a chemical mixing system must have the capability to produce large volumes of replenishment solution on demand, but also should mix sufficiently small volumes of the replenishment fluid at any one time so that only a minimum amount of fluid is allowed to stand during periods of nonuse.

PRIOR DEVELOPMENT

In an attempt to overcome the above-noted problems, my co-workers and I built a chemical mixer dispenser which semiautomatically supplied developer and fixer solutions to a film processor. This mixer dispenser automatically supplied water, but required the manual addition of chemical concentrate. After building ten units, we placed them in hospitals and clinics without charge for field testing. We monitored their operation throughout the tests. The units were generally short-lived as we allowed them to run to destruction usually without replacement of parts. U.S. Pat. application Ser. No. 349,920 was filed on Apr. 11, 1973 covering this semiautomatic system, but it was abandoned on July 12, 1974.

In this semiautomatic system, a relatively large mixing tank and a smaller gravity-fed holding tank were provided for each solution to be mixed and fed to the processor. The mixing tank directly fed into the holding tank by a connecting valve. When the solution had been depleted from the mixing tank causing the level of the solution in the holding tank to drop slightly, a pressure sensitive switch in the holding tank automatically initiated a mixing cycle. At the beginning of the mixing cycle the connecting valve was closed to isolate the mixing tank from the holding tank. Another solenoid valve then opened to admit water to the mixing tank until a predetermined level was reached. At this level a pressure sensitive switch closed the water supply valve. At this time the operator had to manually add the proper quantity of chemical concentrate. After the chemical concentrate had been added, another pressure sensitive switch reopened the water supply valve to admit additional water to the mixing tank. Only if the proper type and amount of concentrate had been added would the additional water provided a mixed solution of the proper concentrations.

The patent application disclosed the feature that a pair of these units could be ganged together to provide an expanded capacity system. This feature, however, although dislosed as being possible, was not used on the ten field tested units.

SUMMARY OF THE INVENTION

The present invention overcomes the above-noted and other problems by providing an automatic fluid mixing system which is ideal for clinical application. The system is automatically operated to mix a fresh, relatively small volume, batch of solution only when an old batch is nearly depleted to minimize oxidation of the solution. Fail-safe operation causes inactivation of the system upon either mechanical or electrical malfunction.

The fluid mixing system of this invention is comprised of at least one mixing unit which includes a reservoir defining tank structure for mixing water with developer or fixer concentrate. A fluid supply structure is associated with the tank structure for supplying the concentrate, and a water input mechanism is provided for coupling a pressurized source of water to the tank structure. The mixing unit further includes a fluid release assembly associated with the tank structure and operated by the admission of water under pressure into the tank structure. This releases a premeasured quantity of concentrate and water into the reservoir. Operation of the fluid release assembly to release the concentrate only when the water is admitted into the tank structure is an outstanding feature of the invention and provides fail-safe and reliable operation.

The mixing unit includes a control apparatus which is responsive to the concentrate in the supply structure and to the volume of mixed solution within the reservoir. The control apparatus operates the water input mechanism and the fluid release assembly upon two conditions: (1) when the fluid supply structure contains a prepackaged amount of the concentrate, and (2) when the volume of mixed solution in the reservoir has become depleted to a predefined minimum volume.

The control apparatus is comprised of a fluid presence indicator and a fluid level indicator for respectively indicating these conditions. The indicators also indicate when the prepackaged amount of the concentrate has been released into the tank structure and when a predetermined volume of water has been admitted to the reservoir for terminating further water input.

In the preferred embodiment, the fluid mixing system includes a pair of similarly constructed mixing units of the described type. The units produce a developer solution and a fixer solution in their respective reservoirs for dispensing to a radiographic film processor on a demand basis.

The fluid supply structure of each unit includes one or more bottles housed in a container for supplying prepackaged quantities of constituent chemicals of the respective fixer and developer solutions. Each bottle includes a membrane or septum over its mouth, which is pierceable to release the bottle contents. One of the outstanding features of the invention is in the provision of nonreusable or reusable containers which are interchangeable. The user has the option of using prepackaged disposable cartons which may be mounted directly in the mixer for dispensing the contents of bottles in the carton or alternatively loading bottles into a reusable plastic carrier that mounts on the mixer. Each type of container has a base which defines a set of apertures for receiving the respective bottles and allowing access to the septums. As another feature, the base is specially configured for cooperating with the control apparatus for preventing inadvertent and undesired mixing cycles.

The tank structure of each unit includes a lower housing which defines a reservoir having an output orifice connected to the film processor. The tank structure also includes an upper housing and a container support structure which is supported by the upper housing for supporting the chemical container. The containers support structure has a recessed upper surface which defines a set of apertures each of which is aligned with a different one of the container apertures. These apertures allow the fluid release assembly to have access to the respective septums for draining the chemicals into the reservoir.

The fluid input mechanism of each unit is a solenoid operated water valve assembly mounted on the upper housing. This mechanism introduces water under pressure to the fluid release assembly in response to actuation of the control apparatus.

The fluid release assembly of each unit is a piercer assembly which is powered by water pressure. The piercer assembly controllably pierces the respective septums and also admits the water under pressure into the reservoir. The piercer assembly includes support and guide structure mounted within the upper housing, and a drive and water output subassembly coupled to receive water under pressure from the valve assembly.

A piercing subassembly is provided which is advanced by the drive subassembly under direction of the support and guide structure when water is allowed through the valve assembly. The piercing subassembly is guided to engage and pierce the bottle septums for draining the chemicals into the reservoir of the tank structure.

The drive and water output subassembly includes a cylinder and a piston. The piston is connected to the piercing subassembly and is reciprocal within the cylinder. The cylinder has an outer structure which defines an outlet port. Water is sprayed through the port under pressure into the reservoir after the piston has been advanced for releasing the chemicals. The pressurized spray facilitates proper agitation of the chemicals and the water.

The fluid level indicator of the control apparatus has a pivotally mounted float mechanism, and a float switch operated by the float mechanism. The fluid presence indicator includes a container switch which is actuated only when a container having the prepackaged quantity of chemical concentrates is placed on the container support structure. The solenoid of the water valve assembly is operated in response to the respective states of the float and container switches. The solenoid is energized when the container switch indicates a full supply of the concentrate is available and when the float switch indicates that the reservoir has been depleted of solution to a predefined minimum level. The solenoid is de-energized when the container switch indicates that the supply of chemical concentrate has been released and when the float switch indicates that an amount of water has been admitted into the reservoir to precisely produce a new batch of solution.

A pilot light and a warning buzzer are provided which are operated by the control apparatus. The light and buzzer respectively indicate: (1) that the bottles have been emptied, and (2) that the bottles have been emptied and the volume of mixed solution in the reservoir has fallen to the predefined minimum level.

A feature of the two unit mixing system is an interlocking arrangement which allows the developer mixing unit to be actuated only by a developer chemical supply and allows the fixer mixing unit to be actuated only by a fixer chemical supply. Each mixing unit has two possible locations for the container switches. A first location is dedicated for use with a developer mixing unit, and a second location is reserved for a fixer mixing unit. An interlocking boss is selectively positioned on or moulded on the base of the corresponding container to allow only the proper chemical supply container, when placed on its support structure, to actuate the respective container switch.

Another feature of the invention is a pair of rinse mechanisms coupled to the piercer assembly. These mechanisms rinse the recessed upper surface of the container support structure and initiate premixing of the chemicals and the water. Two spray heads are positioned on the container support structure to direct pressurized sprays onto the upper surface. The sprays mix with the chemicals and drain into the reservoir through the apertures in the upper surface.

Still another feature of the invention is the versatile design which allows a plurality of mixers which mix the same type of solution to be operated in sequence to provide a system of expanded capacity. The control apparatus and the reservoir outlets of the mixers of identical solutions are respectively interconnected. Fresh batches of solution are mixed in succession in the reservoirs of the respective units only when a previous batch has been depleted and pumped to the film processor. The pilot lights on the units are electrically connected to indicate when each container has been substantially emptied. The warning buzzer of the unit last in the operating sequence is electrically connected to continuously buzz after all containers have been emptied and after the reservoir of the last unit has been depleted. The expanded capacity system allows unusually long periods of fail-safe operation with minimum human vigilance.

It is thus a general object of the present invention to provide a new and improved mixing system for automatically mixing and dispensing fluids.

Other objects, advantages, and a fuller understanding of the invention may be obtained by referring to the following description of a preferred embodiment when read in conjunction with the accompanying drawings.

BRIEF DESCRIPTION OF THE DRAWINGS

FIG. 1b is a schematic view, on an enlarged scale with respect to FIG. 1a, of a mixer unit which is used in the fluid mixing system of FIG. 1a;

FIG. 2a is a perspective view of one type of container and concentrate bottles used in the fluid mixing system of FIG. 1a;

FIGS. 2b and 2c are perspective and cross-sectional views of another type of container used in the fluid mixing system of FIG. 1a;

FIG. 3b is a perspective view of the container support structure of the mixing unit of FIG. 3a;

FIG. 5 is a schematic illustration of a control circuit used in the system of FIG. 1a;

DETAILED DESCRIPTION OF A PREFERRED EMBODIMENT

Figure 1A:
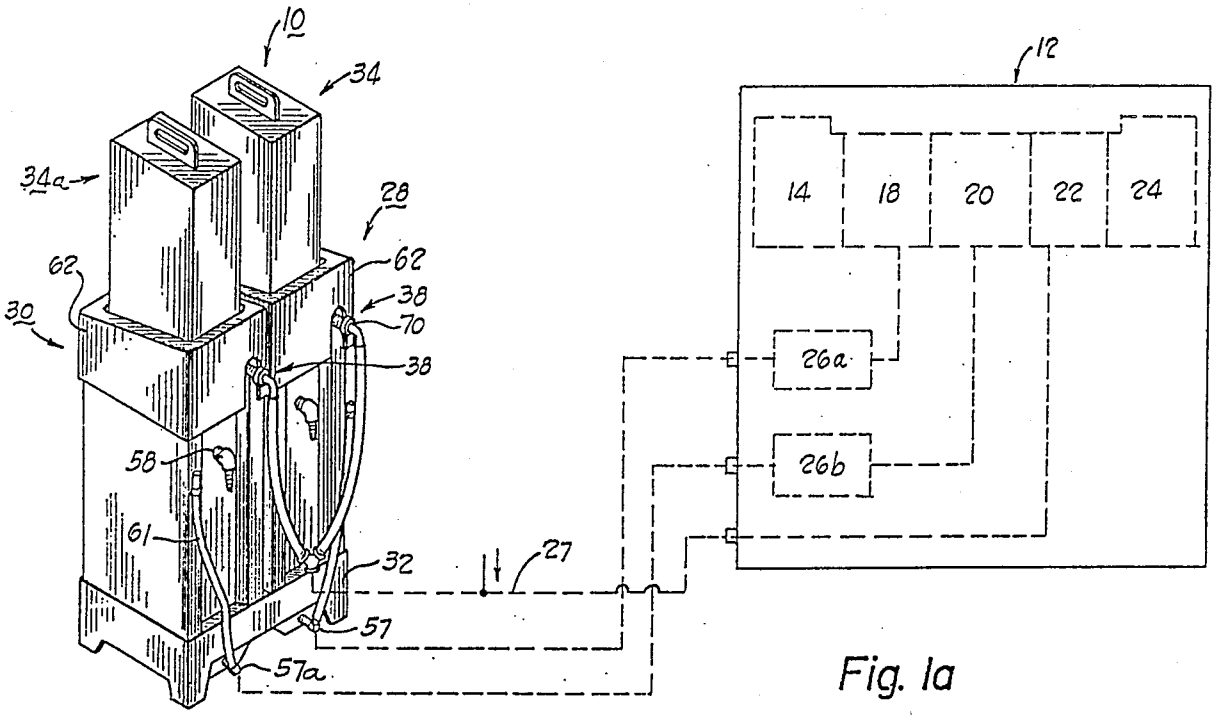
FIG. 1a is a schematic view of a film processor and a perspective view of fluid mixing system constructed and arranged according to the invention and connected to the processor.

In FIG. 1a a fluid mixing system is shown generally at 10. The system 10 is connected to a schematically illustrated X-ray film processor 12. The fluid mixing system 10 mixes and dispenses a fixer solution and a developer solution used by the film processor 12 in processing exposed sheets of film.

As shown schematically, the film processor 12 includes a film feeder 14 into which a collection of the exposed sheets of X-ray film is inserted for processing. The film is fed in a manner described in the referenced FILM PROCESSOR patent through developer, fixer, and rinse tanks 18, 20, 22, respectively. The processor 12 also includes a dryer 24 for completing the film processing.

Fluid pumps 26a, 26b are coupled to the developer and fixer tanks 18, 20 and to the mixing system 10. The pumps 26a, 26b supply the tanks 18, 20 with developer and fixer solutions from the mixing system 10 for maintaining the strength and volume of the solutions in the tanks 18, 20 as they are depleted during the processing of the film. A water line 27 supplies water to the rinse tank 22 and to the mixing system 10.

The fluid mixing system 10 is comprised of a developer mixing unit 28 for mixing and dispensing the developer solution to the developer tank 18, and a fixer mixing unit 30 which mixes and dispenses the fixer solution to the fixer tank 20. A base 32 is provided for supporting the developer and fixer mixing units 28, 30.

THE DEVELOPER MIXING UNIT 28

Figure 1B:
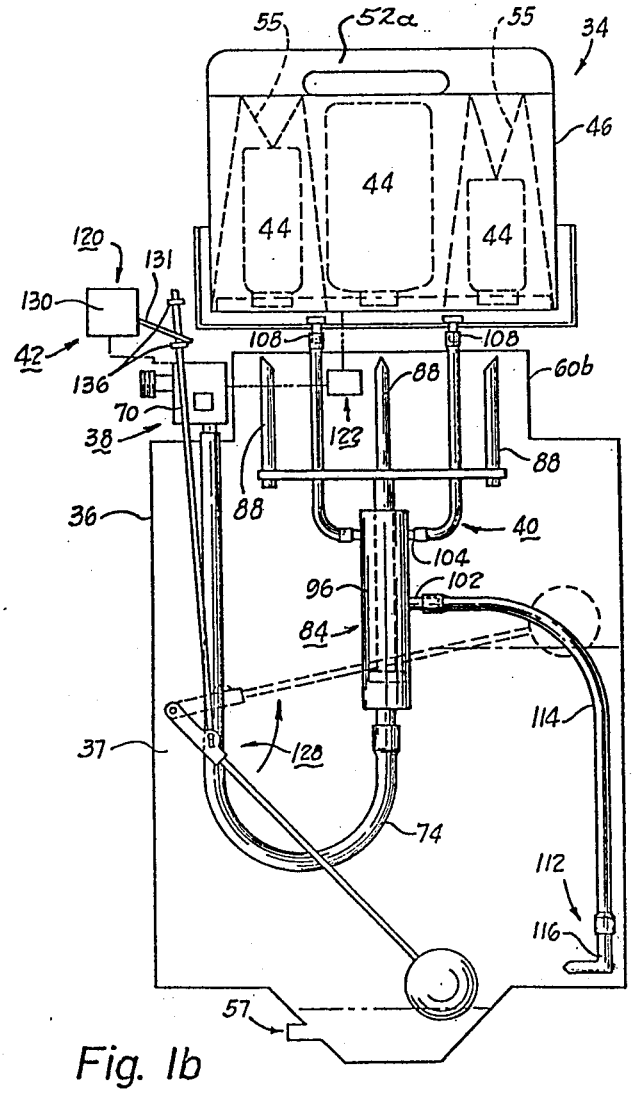

The developer mixing unit 28 is schematically illustrated in FIG. 1b. The mixing unit 28 uses a developer chemical supply 34 which includes containers of chemicals which, when diluted with water, produce the developer solution. The unit 28 includes a tank structure 36 which supports the developer chemical supply 34. The tank structure defines a reservoir 37 under the chemical supply 34 in which the developer solution is mixed.

A water input mechanism 38 is connected to the tank structure 36 for coupling a source of pressurized water to the tank structure 36 to provide a source of pressurized water for the reservoir. A fluid release assembly 40 is disposed in the tank structure and is coupled to the water input mechanism 38. The fluid release assembly 40 is operated by water under pressure to release the developer chemicals and allow them to flow into the reservoir 37.

A control apparatus 42 is also disposed within the tank structure 36. The control apparatus 42 functions to operate the water input mechanism 38 and the fluid release assembly 40.

Conditioned upon (1) the developer chemical supply 34 having a predetermined amount of the containerized developer chemical, and (2) the developer solution within the reservoir 37 falling to a predetermined level, the control apparatus 42 operates the water input mechanism 38 to actuate of the fluid release assembly and introduce a fresh supply of water into the reservoir.

Operating the release assembly 40 with water which is introduced only upon the actual introduction of water through the mechanism 38 is a feature which provides fail-safe operation. If the control apparatus 42 malfunctions or if pressure in the water line 27 is low, the mixing unit 28 will not operate. This substantially eliminates chances for mixing improper concentrations of the solution.

THE CHEMICAL SUPPLY 34

Figure 2A:
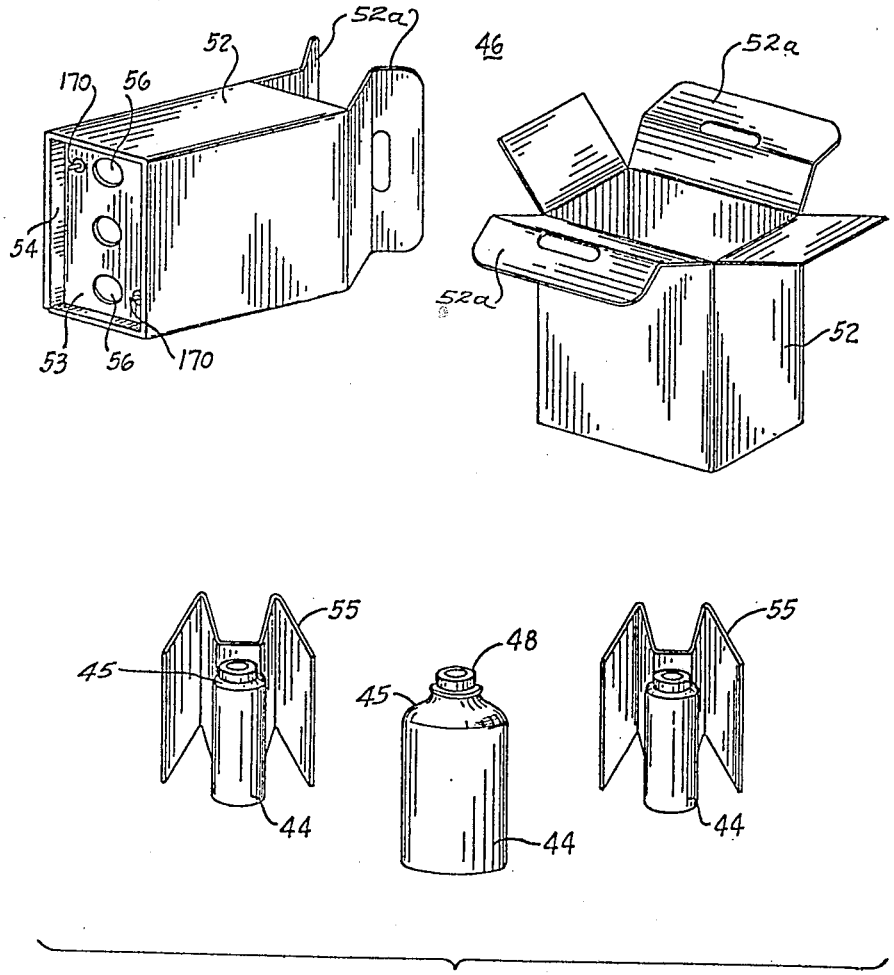

One arrangement of the developer chemical supply 34 is shown in FIGS. 1b and 2a. One or more inverted vessels in the form of bottles 44 are supported within a container in the form of a carton 46. For purposes of illustration, three associated bottles of conventional three-part developer chemical are shown. Two of the bottles are of a relatively small size, and the third bottle is of a relatively larger size.

Each bottle 44 is plastic and has a neck 45 of a preselected necks 45. The configurations preferably are of different sizes and coordinate with the carton 46 for assuring the insertion of the proper assortment of bottles into each carton 46. A protecting cap 48 covers a thin, centrally located, mouth-sealing septum 50. Each septum is sealed to the neck of its bottle. The cap may or may not have a central aperture (as shown in FIG. 2a, it has an aperture). The septum 50 is pierceable through an apertured cap or after removal of a nonapertured cap 48 to release the developer chemical contained in the bottle 44.

The carton 46 is constructed to enable it to rest securely on top of the tank structure 36 and to securely position the bottles 44 in inverted, aligned relation to the fluid release assembly 40. As shown in FIG. 2a, the carton 46 is comprised of an elongated outer support structure 52 having a handle 52a at one end for facilitating carriage. A base insert 53 is secured to and recessed within the end of the outer support structure 52 opposite the handle 52a. The base 53 is suitably secured by stapling. A flange 54 is defined by the periphery of the base 53 and the structure 52. A pair of partition members 55 are disposed within the outer support structure 52. The partition members 55 define three chambers within the outer support structure 52 into which the bottles 44 are inserted. The partition members 55 also define an abutment for securing the smaller bottles 44 in engagement with the base 53.

The base 53 defines a set of carton apertures 56 each of a diameter larger than that of the caps 48. This permits the necks 45 to project through the apertures 56. The flange 54 is of sufficient depth to prevent the necks 45 from extending beyond the plane defined by the lower edge of the flange 54. This configuration facilitates storage and handling by enabling the carton 46 to rest on any flat surface without the projecting ends of the bottles 44 or their septums touching the surface.

An outstanding feature of the invention is that the container may be either reusable or disposable. The cartons 46 are disposable and are sealed before delivery to the user with the bottles 44 in place. An inexpensive container material, such as treated cardboard, is used for the container. This material is usually not durable and is not suitable for reuse due to wetting by the fluid during a mixing cycle.

Figure 2B:
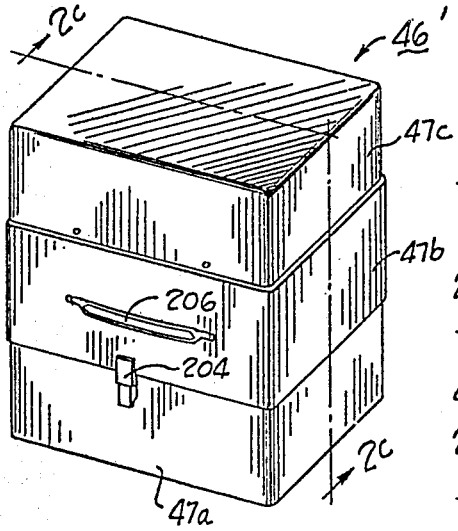

The reusable containers are injected molded plastic carriers 46′, FIG. 2b. The carriers 46′ are made of separable sections 47a, 47b and 47c to allow the replacement of emptied bottles after a mixing cycle. With reusable containers, the system attendant merely disassembles or opens the container and inserts new bottles of fresh fluids.

The structure of the reusable plastic carrier is functionally similar to the carton depicted in FIG. 2a insofar as its coaction with the mixing unit is concerned. As shown in FIGS. 2b–2g, the reusable container includes a plurality of interlocking, stacked and detachable sections 47a, 47b, 47c for removal and insertion of the bottles 44. The sections 47a, 47b define apertures 49 that are of differing sizes and configurations to coordinate with the differing sizes and configurations of the associated bottles 44. This assures that the bottles 44 are inserted properly, into the reusable container, and prevents fixer concentrate from being inserted into the developer supply 34 and vice versa.

The construction and shape of the section 47b is a feature of the invention in that it may be used, with only slight modifications, as the middle section 47b for either the fixer supply 34a or the developer supply 34. Accordingly, only a single injection mold is needed for manufacturing the section 47b. If desired, dye may be injected into the mold during the molding process for color coding the section 47b and thereby facilitating identification of the type of supply 34 with which the section 47b is to be used.

The section 47b includes upper and lower lateral surfaces 200, 202 which respectively are enclosed by the sections 47c and 47a. The lateral surface 200 has its apertures 49 in unique sizes and shapes to accommodate the bottles 44 of one type of supply 34, and the surface 202 has its apertures 49 of unique sizes and configurations to accommodate the other type of supply 34. A metal strap 199 is fastened over the center aperture 49 for supporting the center container 44.

Figure 2C:
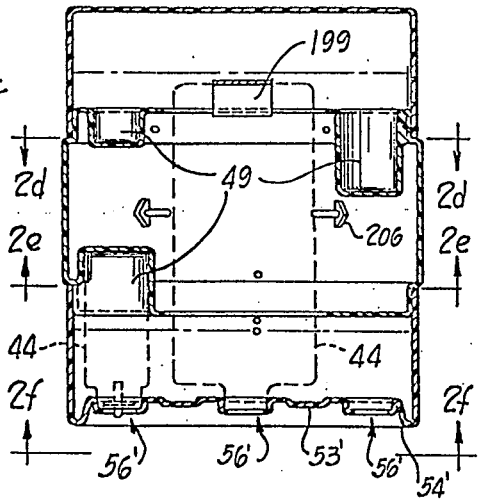
Figure 2D:
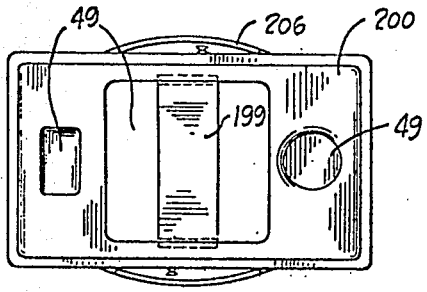
FIGS. 2d–2e are cross-sectional views.
Figure 2E:
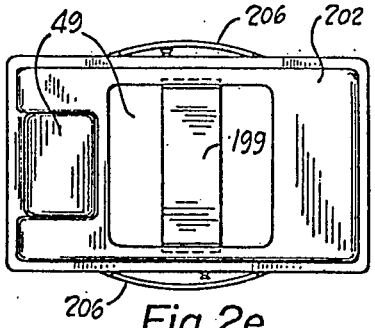
Figure 2F:
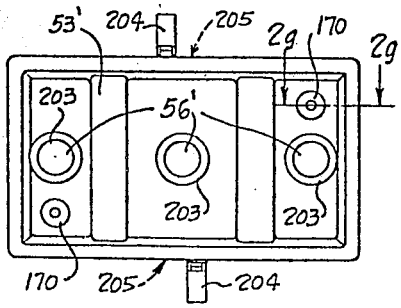
FIG. 2f is a bottom view, of the container taken along the lines 2d—2d, 2e—2e, and 2f—2f in FIG. 2c.
Figure 2G:
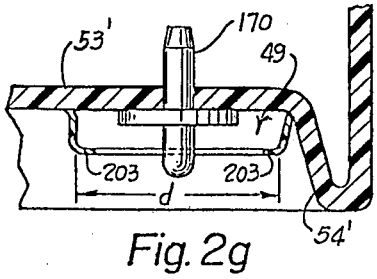
FIG. 2g is a cross-sectional view taken along lines 2g—2g in FIG. 2f.

In the illustrated container 46′, the center aperture 49 in the surfaces 200, 202 is of a relatively large rectangular shape to receive a relatively large rectangularly shaped bottle of concentrate (shown in phantom outline in FIG. 2c). The corresponding aperture 49 in the other chemical supply 34a (not shown) is of a generally round shape so that the respective bottles 44 cannot be interchanged. During manufacture, in order to use a single injection mold to form the sections 47b, for both fixer and developer supplies, these center apertures 49 are separately cut after the injection process according to the particular type of supply being manufactured. The other apertures 49 are formed by the mold.

After the center aperture 49 has been cut, the section 47a is riveted to the section 47b, for covering one of the surfaces 200, 202, leaving the other surface 202, 200 (according to the type of supply) for receiving the bottles 44.

The section 47a has a recessed base 53′ which provides a flange portion 54′. The base 53′ defines apertures 56′, all of which are recessed within the flange portion 54′. The apertures 56′ have an inside diameter d which is larger than the mouth of the bottles 44, but which is smaller than the caps 50. Each aperture has a lip 203 against which the mouth of the bottle 44 abuts when the sections 47a, 47b, 47c are fastened together. With this configuration, the sections 47a, 47b, 47c can be fastened together only if the caps 50 are removed from the bottles 44. For this container, nonapertured caps are preferred, and the described size of the apertures 56′ assures that the caps will be removed before loading of the container 46′ is completed, and before it is placed on the particular mixing unit.

A snap latch 204 is provided for latching the sections 47b, 47c together. Only if the caps 50 have been removed from the bottles 44 will the section 47a fit securely on the section 47b to allow the latches 204 to close. The latches 204 are selectively disposed an offset distance from center of the longitudinal axis of the sections 47a, 47b, 47c. They are displaced on one side of center for the illustrated type of supply 34 and are displaced on the other side of center for the other type of supply 34a, as exemplified by the phantom arrow 205 in FIG. 2f. This assures that a developer section 47c is not placed on a fixer section 47b and vice versa.

A carrying handle 206 is secured on each long side of the section 47b. This allows the loaded reusable container 46′ to support the bottles 44 along their longitudinal axis during transport. This minimizes the amount of pressure placed on the latches 204 when the container 46′ is being transported.

THE TANK STRUCTURE

Figure 3A:
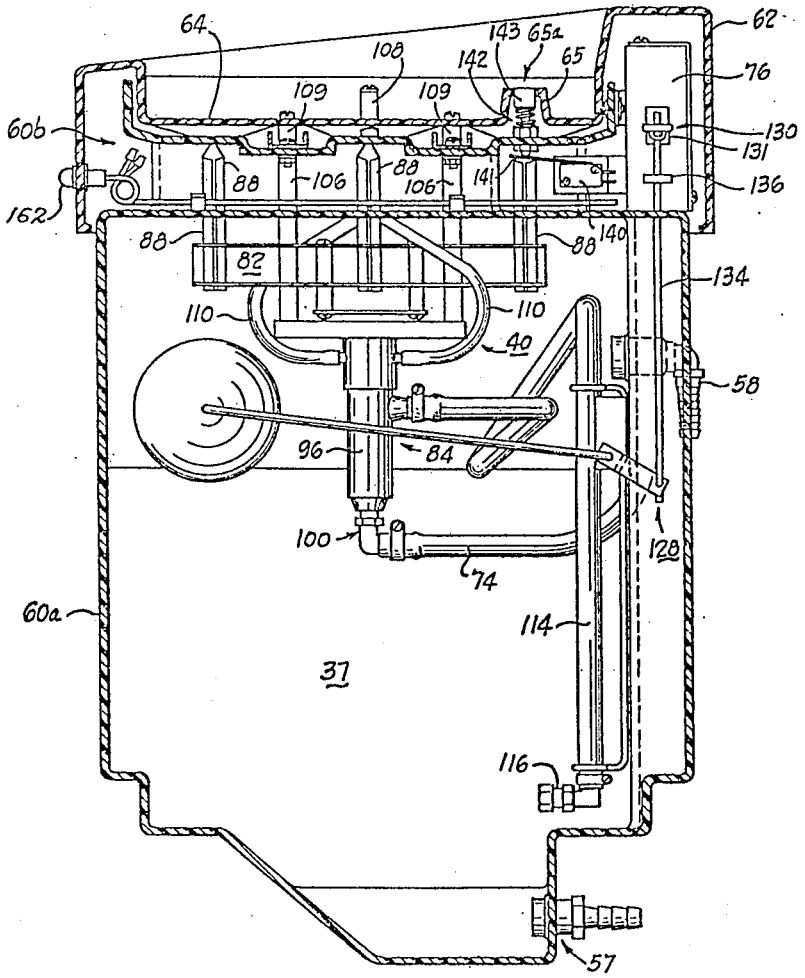
FIG. 3a is a cross-sectional view of a mixing unit in the fluid mixing system of FIG. 1a which shows the tank structure, the fluid release assembly and part of the control apparatus.

The tank structure 36 is shown in detail in FIG. 3a. The structure has a support housing formed of lower and upper portions 60a, 60b. A container support structure 62 is provided which is removably supported by the upper housing portion 60b. The upper housing portion 60b also supports the fluid release assembly 40 and mounts the water input mechanism 38 as shown in FIGS. 1a and 1b.

The lower housing portion 60a defines the reservoir 37 in which the developer chemical and water are mixed. The portion 60a also supports an outlet fitting 57 and an overflow 58. A tee connector 59 is secured to the fitting 57 and has an output port coupled for transmitting solution to the system 12. A hose 61 is coupled to the other port of the connector 59 to allow an auxiliary extraction from the mixing unit.

In the preferred embodiment the reservoir 37 has a five-gallon capacity. The five-gallon capacity has proven to provide a practical minimizing of oxidation of the solution since it has been found to be the smallest quantity that is practical to meet clinical demands. Since it is the smallest practical quantity it minimizes the number of time periods during which any given mixed quantity of solution stands unused.

Figure 3B:
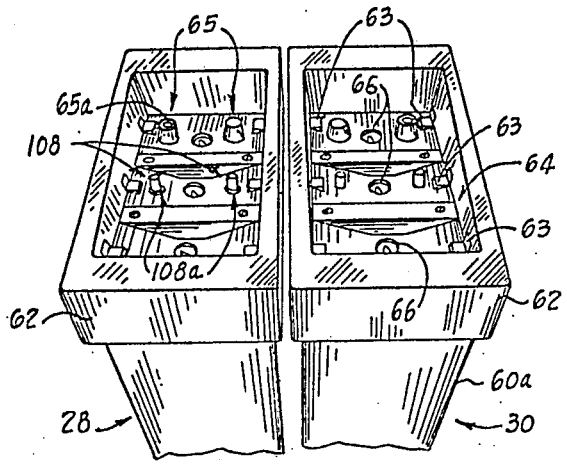

Referring to FIG. 3b, the container support structure 62 is preferably in the form of a hood having a recessed upper surface 64 which engages the container flange 54. Pairs of seats 63 are positioned on adjoining walls at each corner of the upper surface 64 for guiding and firmly securing the container 46 in proper aligned position slightly elevated above the surface 64.

The upper surface 64 defines a pair of bosses 65. One of the bosses has a plunger-receiving bore 65a to permit a container-sensing apparatus which will be described presently to respond to a positioned container. The upper surface 64 also defines a set of three fluid supply apertures 66. The fluid supply apertures 66 correspond to and are aligned with the apertures 56 of a positioned one of the containers 46. The fluid supply apertures 66 provide access to the septum 50 at the mouth of each bottle 44 for enabling the fluid release assembly 40 to release the developer chemical into the reservoir 37.

A selected one of the bosses 65 is provided with an open end which allows only the developer chemical supply 34 access to actuate the underlying control apparatus 42. This assures that the proper chemicals will be mixed in the reservoir 37 and dispensed to the film processing system 12.

THE WATER INPUT MECHANISM 38

The water input mechanism 38 underlies the support structure 62 and is secured to the upper housing portion 60b. The mechanism 38 is comprised of a water valve assembly 70 which is coupled to the pressurized source by the water line 27. The water valve assembly 70 is operated by the control apparatus 42 for introducing the pressurized water into the tank structure 36. A water line 74 is coupled between the valve assembly 70 and the fluid release assembly 40. The line 74 provides water for powering the fluid release assembly 40 and for introducing water into the reservoir 37 through the release assembly 40.

An electrical box 76 is provided on the upper housing portion 60b. The box 76 houses the water valve assembly 70 and portions of the control apparatus 42.

THE FLUID RELEASE ASSEMBLY 40

Figure 4C:
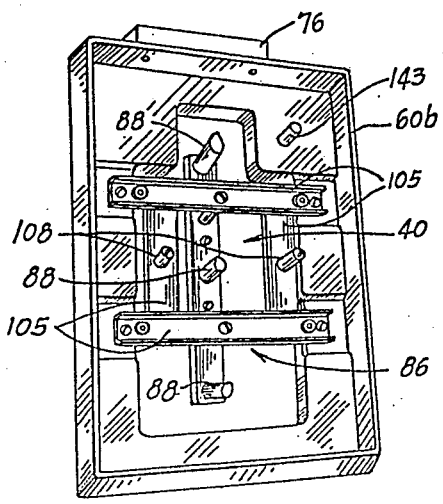
FIG. 4c is a perspective view showing the piercer assembly mounted within the upper housing of the tank structure.
Figure 4A:
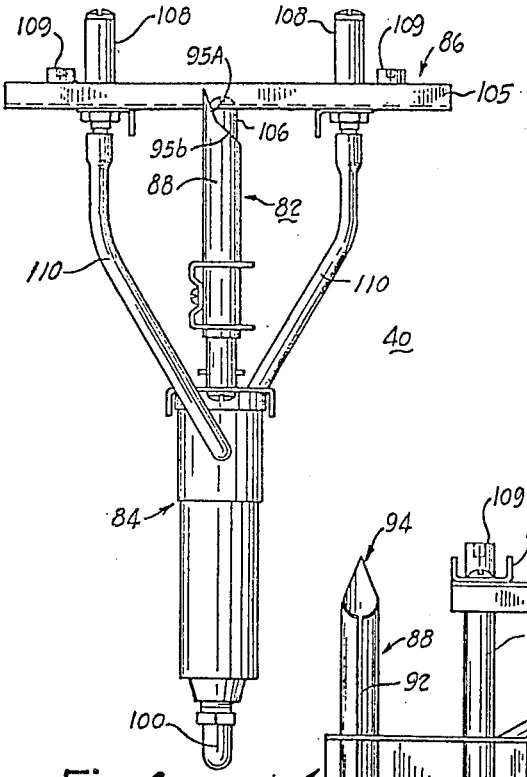
FIG. 4a is an end view of a piercer assembly which serves to release concentrate from the bottles.
Figure 4B:
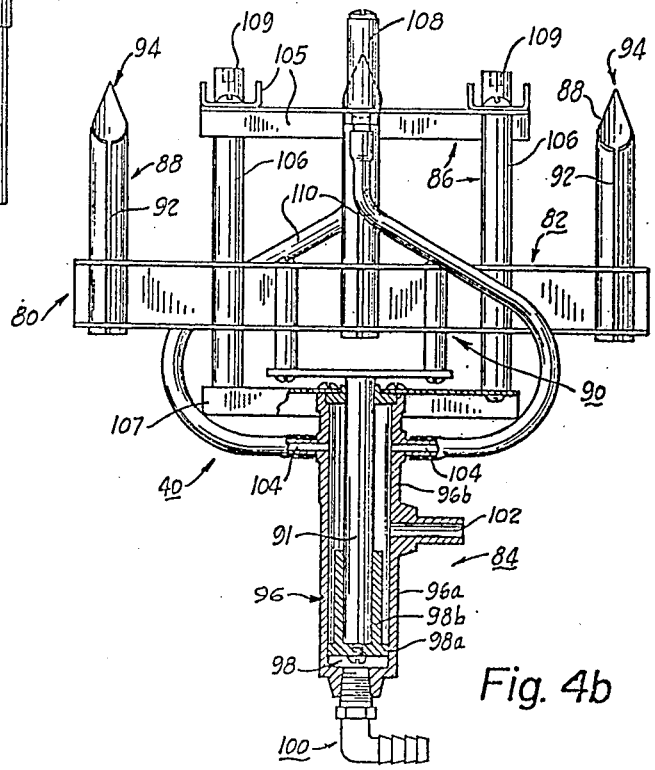
FIG. 4b is a side view, partly in section, of the piercer assembly.

A preferred embodiment of the fluid release assembly 40 is shown in FIGS. 4a and 4b. The release assembly includes a movable piercer assembly 80 having a piercing subassembly 82. A drive subassembly 84 is connected to the piercer subassembly to cause selective movement of the piercer. The piercer is guided along a rectilinear path by a support and guide structure 86. The piercing subassembly 82 is operable, when driven, to pierce the septum 50 of each positioned bottle 44.

The movably supported piercing subassembly 82 has a set of three tubular piercers 88 and piercer support 90. The piercers 88 are supported in alignment with the fluid supply apertures 66 for rupturing the septums 50.

Each of the piercers 88 is a metal tube having a pointed end portion 94. The pointed end portion 94 is a feature which assures piercing of the septums 50 without coring. This is advantageous because coring could produce a severed piece of septum material which could become lodged in one of the metal tubes and obstruct drainage to the reservoir 37. A severed piece of septum can cause other problems such as, passing into the reservoir 37 and plugging the outlet 57.

The pointed end 94 of each piercer 88 is formed by a cut-away section which defines a slicing edge portion 95a and a fold-over edge portion 95b. The slicing portion 95a is the upper portion of the piercer 88 and includes the tip. The fold-over portion 95b is the lower portion of the section and defines the side of the piercer 88 opposite the tip.

The slicing portion 95a is an efficient piercer and has an edge which cleanly slices the septum 50. It is defined by an edge which is formed at a relatively small angle with the axis of the piercer. In the preferred embodiment this angle is thirty degrees from the axis.

The fold-over portion 95b is an inefficient piercer which tends to push, tear, and fold over the septum 50 without completely severing a piece of the septum. The fold-over portion 95b is defined by an edge which is formed at a larger angle to the tube axis than the angle of the slicing portion 95a. In the preferred embodiment, the angle of the fold-over portion is forty-five degrees.

A longitudinal slit 92 extends the length of each piercer 88 and intercepts the fold-over portion 95b. The slit 92 is formed during manufacture of each piercer 88, as the tube is formed by rolling a flat sheet. The slit 92 assists in preventing coring of the septum 50 by guaranteeing that a link of septum remains connected between the severed edge of the septum and the remaining septum.

The drive subassembly 84 has a hollow cylinder 96 which is secured to the guide structure 86. A water-driven piston 98 is reciprocally mounted in the cylinder 96 and is fixed to the rod 91. A connector assembly 100 connects the cylinder 96 to the water line 74 for introducting a piston-actuating supply of water into the cylinder 96.

The piston 98 includes a head portion 98a and a hollowed cylindrical portion 98b which receives and is secured to the rod 91. As the piston 98 is advanced by water pressure from the introduction of water through the input mechanism 38, the rod 91, and thus the piercing subassembly 82 and the piercers 88 are advanced for piercing the positioned septa.

The hollow cylinder 96 has a piston chamber composed of a lower, cylindrically contoured, piston drive portion 96a and an upper, flared, piston bypass portion 96b. The lower portion 96a cooperates with the head 98a of the piston for defining a substantially watertight seal so that the piercers are driven up forcefully when water is first introduced through the connector assembly. The flare of the upper portion 96b allows a bypass flow of water around the head portion 98a when the piston 98 is advanced into the upper portion 96b.

The cylinder 96 has an output port 102 and a set of rinse ports 104. The output port 102 is at the beginning of the flare of the upper portion 96b and directs water into the reservoir 37 after the piston 98 has been advanced beyond the port 102 and into the flared upper portion 96b. The rinse ports 104 are in the upper portion 96b and receive the water which bypasses the head 98a when the piston 98 is in the upper portion 96b.

The support and guide structure 86 includes four straps 105 secured together in a generally rectangular configuration, as seen in FIG. 4c. The straps 105 are secured to the upper housing 60b. A pair of guide posts 106 are secured to the straps 105, and a piece of stainless channel 107 supports the guide posts 106 from the cylinder 96. The guide posts 106 guide the piercer support 90 as it is advanced by the piston 98. A plurality of threaded mounts 109 are secured to the straps 105 for mounting the structure 62 by means of screws.

A rinse mechanism is mounted to the guide structure 86 and provides one of the features of this invention. The rinse mechanism directs water onto the recessed upper surface 64 of the container support structure 62 for rinsing the surface 64 of chemicals and for initiating premix of the chemicals with water. The rinse mechanism comprises a set of spray heads 108 and a pair of hoses 110 coupling the spray heads 108 to the rinse ports 104. The spray heads 108 extend from the support and guide structure 86 through spray head apertures 108a formed through the container support 62.

An agitator assembly 112 is provided as a feature which facilitates mixing. The agitator 112 directs the water introduced through the output port 102 under pressure into a relatively rapid stream which creates an agitating swirl within the reservoir 37. The agitator assembly 112 includes a hose 114 coupled to the output port 102 and a water jet mechanism 116 coupled to the hose 114 for producing the fast-moving stream of water and creating the agitating swirl.

Figure 5:
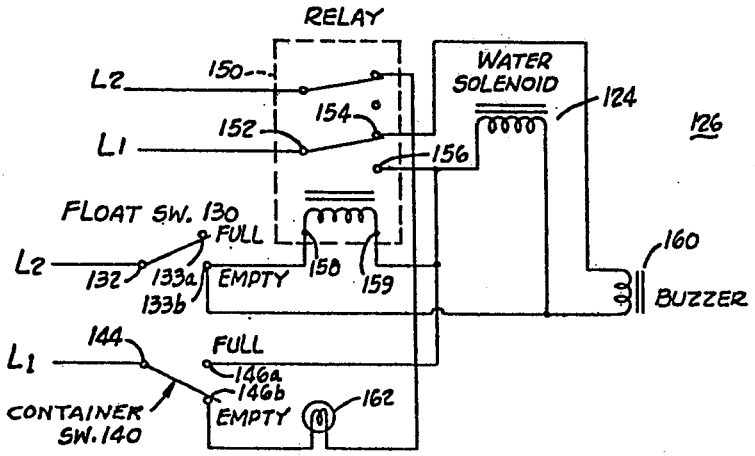

THE CONTROL APPARATUS 42 (FIGS. 1b, 3a and 5)

The control apparatus 42 includes a fluid-level indicator 120 for indicating the volume of developer solution within the tank structure 36, and a fluid-supply indicator 122 for indicating that a predetermined amount of chemical is contained by the chemical spray 34. A solenoid 124 is provided in the electrical box 76 for operating the water-valve assembly 70. Electronic control circuitry 126 is also provided in the box 76 and is coupled to the indicators 120, 122 for operating the solenoid 124.

The control circuitry 126 operates the solenoid 124 to introduce water into the tank structure 36 only upon the conditions that (1) the volume of developer solution within the reservoir 37 is less than a first predetermined value, preferably one quart, and (2) the chemical supply 34 contains a predetermined amount of developer chemical within the chemical container 46.

In the preferred embodiment, the fluid-level indicator 120 is a float-switch mechanism which includes a pivotally mounted float 128 and a float switch 130 operated by the float 128. The float switch 130 is a two-position switch which is mounted within the box 76. An actuator lever 131 extends from the switch 130 and outside the box 76 and is connected to the float mechanism 128.

As shown in FIG. 5, the float switch 130 includes an input terminal 132 and a pair of output terminals 133a, 133b which are selectively connected to the input terminal 132 in response to positioning of the actuator lever 131. When the actuator lever 131 is advanced due to a "full" reservoir 37, the output terminal 133a is connected to the input terminal 132. Conversely, an "empty" reservoir causes the output terminal 133b to be connected to the input terminal 132.

The float mechanism 128 includes a rod 134 which is slidably coupled through an aperture in the actuator lever 131. A pair of solution-level-determining stops 136 are slidably supported on the rod 134. The stops 136 engage and advance the lever 131 for setting the state of the float switch 130 in accordance with a desired level of solution within the reservoir 37. In the preferred embodiment, the stops 136 are positioned to set the switch 130 into an "empty state" to condition the water-valve assembly 70 to open via the output terminal 133b when only one quart of solution remains in the reservoir 37. The stops 136 are positioned to set the switch 130 into a "full" state for closing the valve assembly 70 when approximately twenty-one quarts of solution are within the reservoir 37.

In the preferred embodiment, the fluid-supply indicator 122 includes a two-state container switch 140 and a spring-loaded plunger mechanism 142. The container switch 140 has a movable actuator lever 141. The mechanism 142 includes a plunger 143 for engaging the lever 141 and actuating the container switch 140.

As seen in FIG. 5, the switch 140 includes an input terminal 144 and a pair of output terminals 146a, 146b. The terminals 146a, 146b are electrically connectable to the input terminal 144 in response to movement of the plunger mechanism 142.

The plunger mechanism 142 is mounted on the upper portion 60b of the support housing 60 for engagement with the container 46 of the developer chemical supply 34. The spring loading of the plunger mechanism 142 is correlated to the weight of the chemical supply 34 having a predetermined quantity of the developer chemical, i.e., a full container of chemical. Whenever a full container is supported by the container support structure 62, the plunger 143 is advanced for actuating the container switch 140 into a "full" state, indicating that the predetermined amount of chemical is available for mixing. The "full" state of the container switch 140 conditions the valve assembly 70 for opening.

After the bottles 44 have been emptied into the tank structure 36, the spring bias overcomes the weight of the empty supply 34 to cause the plunger 143 to be withdrawn. This actuates the container switch 140 into an "empty" state representative of the predetermined amount of the chemical being unavailable. As sensed by the plunger mechanism 142, the chemical supply 34 having empty bottles 44 is equivalent to the removal of the chemical supply 34 from the tank structure 36.

As seen in FIG. 3b, the hollowed boss 65 protectingly surrounds the plunger 143, as an important safety feature. The boss 65 extends from the upper surface 64 at least to the end of the plunger 143 and prevents inadvertent advancement of the plunger and resultant inadvertant actuation of the piercer assembly 80.

Status indicators, including a warning buzzer 160 and a pilot light 162, are mounted to the front of the support structure 62 and audibly and visually indicate the conditions of the float switch 130 and the container switch 140, respectively. When the container switch 140 is in the "empty" state indicating that a full chemical supply 34 is not present, the light 162 is energized. When the container switch 140 is in the "empty" state concurrently with the float switch 130 being in the "empty" state, the buzzer 160 is energized. The energization is maintained until a container 46 having a fresh supply of chemical is positioned on the tank structure 36.

The control circuitry 126 includes a latching relay 150 and circuitry which couples the container switch 140, the float switch 130, the buzzer 160, the light 162, and the solenoid 124 to the latching relay 150. Upon selected states of the switches 130, 140 the relay 150 latches "on" and operates the solenoid 124 for directing water through the valve assembly 70 to the release assembly 40.

The relay 150 has a switching input contact 152, a pair of switching output contacts 154, 156, and a pair of energizing terminals 158, 159. The input contact 152 is coupled to a first, externally supplied reference potential L1. The pair of switching output contacts 154, 156, are respectively coupled through the warning buzzer 160 and through the water solenoid 124 to the output terminal 133b of the float switch 130. The pair of energizing terminals 158, 159 are respectively coupled to the output terminal 133b of the float switch 130 and to the output terminal 146a of the container switch. The energizing terminal 159 is also coupled to the switching output contact 156. The first reference potential L1 is also coupled to the input terminal 144 of the container switch 140, and a second reference potential L2 is coupled to the input terminal 132 of the float switch 130. The pilot light 162 is serially connected between the second reference potential L2 and the terminal 146b of the container switch 140.

The solenoid 124 is operated by the control circuitry 126 to open the water valve assembly 70 only upon the conditions that the chemical supply 34 is full and the volume of solution in the reservoir 37 falls to the one-quart "empty" level. Upon these conditions the first reference potential L1 is coupled via the container switch 140 to the actuator terminal 159 and to the water solenoid 124. As soon as the volume of solution in the reservoir 37 falls to the one-quart level, the second reference potential L2 is coupled via the float switch 130 to the water solenoid 124. This completes the circuit through the solenoid 124 and causes it to open.

The second reference potential L2 is also coupled via the float switch 130 to the exciter terminal 158 for energizing the relay 150. This connects the first reference potential L1 to the actuator terminal 159 and to the water solenoid 124. When the relay 150 energizes, it latches into the energized state due to the common connection between the excitation terminal 159 and the switching output terminal 156. This connection maintains energization of the water solenoid 124 after the container switch 140 changes state and until the float switch 130 changes to the "full" state.

When the container switch 140 changes to the "empty" state indicative of the container 44 having released its chemicals, the pilot light 162 is actuated. In this condition the water solenoid 124 remains excited via the latched contacts 152, 156.

When the float switch 130 changes to the "full" state indicating that sufficient water has been introduced into the reservoir 37, the voltage L1 is removed from the terminal 158 and from the solenoid 124. This causes the relay 150 to return to its deactuated state for deenergizing the solenoid 124 and closing the water valve assembly 70.

After the processing system 12 has depleted the developer solution within the reservoir 37 to the minimum one-quart level, the float switch 130 returns to its "empty" state. This causes the buzzer 160 to be energized through the switching contacts 152, 154 and the output terminal 133b of the float switch 130 if a full chemical supply 34 has not been placed on the tank structure 36.

THE CONTAINER INTERLOCK

A pair of projecting, interlocking, flanged pins 170 of suitable configuration are positioned in opposite corners of the base 53 of the container 46. The pins extend to less than the depth of the flange 54 to avoid their interference with storage of the carton. One of the pins 170 is positioned to depress the plunger 143 of the plunger mechanism 142 through the hollowed boss 65 when a full supply 34 is positioned on the structure 62.

Use of the pins 170 in combination with the recessed plunger 143 is an important feature which prevents inadvertent actuation of the plunger mechanism 142.

The pins 170 are preferably individually attachable by spring clips into holes provided in the base 53, but other configurations are suitable. For example, the pins may be unitarily formed in the base 53.

The provision of interlocking pins 170 in opposite corners of the base 53 assures that a developer chemical supply 34 will depress the plunger 143 in either orientation of the supply. This feature facilitates mounting a supply on the mixing unit because either end of a supply may be toward the front.

As is seen in FIG. 3b the container support structure 62 defines a spaced pair of the hollowed bosses 65. This is a feature which allows a single support structure 62 to be utilized, upon a minimum modification, for either the developer or the fixer mixing units. One of the bosses 65 has an open end according to the type of the mixing unit and corresponds to one of the pins 170. The plunger mechanism 142 and the associated container switch 140 are positioned in alignment with the one boss. The mechanism 142 and the switch 140 are aligned under the one boss if the unit is a developer mixing unit 28, and are aligned under the other boss 65 (which is then opened) if the unit is a fixer mixing unit 30. Thus, the plunger 143 of a developer unit will be depressed only if a developer, not a fixer, container is mounted on the unit.

THE FIXER MIXING UNIT 30

The construction and arrangement of the fixer mixing unit 30 is similar to that of the developer mixing unit 28. Assuming that the fixer chemical, like the developer chemical, is a three-part chemical, the only structural difference between the developer and the fixer mixing units 28, 30 is in the interface structure between the chemical supply and the tank structure for enabling only a fixer supply to activate a fixer tank structure. The position of the open-ended boss 65 is reversed, as is the positioning of the spring-loaded plunger mechanism 142 and the associated container switch 140 in the tank structure 36. The interlocking pins 170 in the base 53 are positioned in the other opposing corners to correspond to the boss 65. It is understood that if other than a three-part solution was utilized, the piercer assembly 80, the number and spacing of the apertures 56, 66, and the numbers of bottles 44 could all be modified to accommodate the particular situation.

THE EXPANDED-CAPACITY SYSTEM

Figure 6:
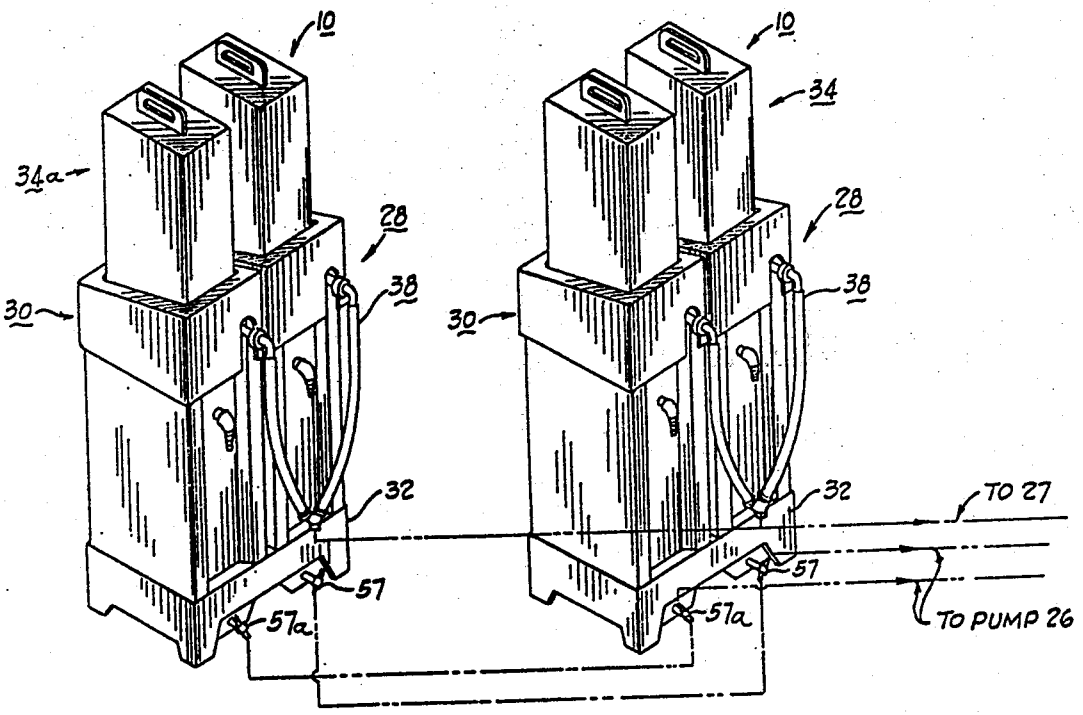
FIG. 6 is a perspective view of a multiunit-fluid mixing system.

A feature of the mixing units is the ease with which a plurality of like units are interconnected to provide and expanded-capacity system. Several developer mixing units 28 are interconnected and several fixer mixing units 30 are interconnected in a manner as shown in FIG. 6. The outlets 57 of each developer tank structure 36 are connected; the outlets 57a of each fixer tank structure 36 are connected; and the control circuits 126 are interconnected.

Figure 7:
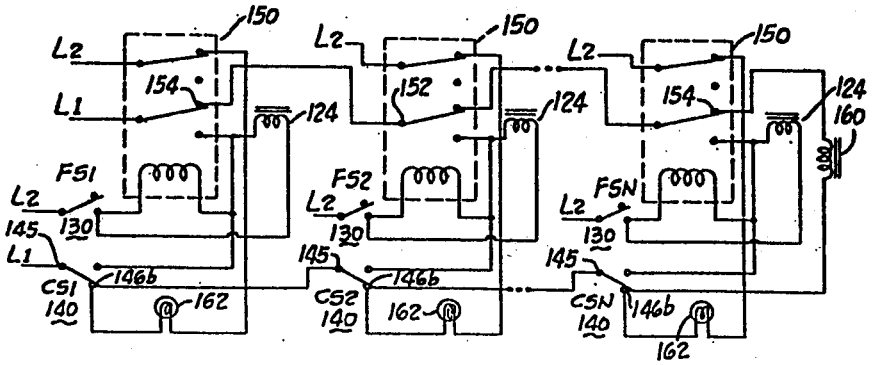
FIG. 7 is a schematic illustration of a control circuit used in the multi-unit fluid mixing system of FIG. 6.

The interconnection of the control circuitry 126 in the expanded capacity system is shown in FIG. 7. The switching output contact 154 of the first control circuit in the series is connected to the switching input contact 152 of the next circuit and so forth. The last circuit in series has the warning buzzer 160 connecting its switching output terminal 154 to the output terminal 146b of the container switch CSN. The input terminal 145 of the first container switch CS1 is connected to the first reference potential L1. The input terminals 145 of the other container switches are respectively connected to the previous output terminal 146b. Each pilot light 162 is coupled to the output terminal 146b of its associated container switch. The remaining connections of the respective relays 150, float switches 130, and water solenoids 160 are connected as shown with respect to FIG. 5 for a single mixing unit.

In the expanded capacity system each developer solution and each fixer solution is mixed in five-gallon batches, with the various mixing units successively being actuated on a demand basis by the interconnection of the control circuitry 126. A fresh five-gallon batch is mixed as soon as the film processing system 12 depletes the previously mixed batch to a one-quart "empty" level. As each mixing unit releases its chemicals, the respective pilot light 162 is actuated indicating its chemical supply 34 is empty. The warning buzzer 160 of the last unit is actuated when the last five-gallon batch of the respective mixing units has been mixed and depleted to the one-quart level. The warning buzzer 160 remains actuated until a fresh chemical supply has been placed on one of the mixing units.

It is also apparent that a single mixing unit, 28 or 30, could be dedicated for mixing only the developer solution or the fixer solution. A pair of the container support structures 62 corresponding to the particular solution are positioned over each reservoir 37. The output orifices 57, 57a are directly coupled together and to the film processing system 12. The control circuitry is interconnected as shown in FIG. 7 for as many units slaved together as desired. This embodiment has the advantage that it offers to the attendant of the chemical mixing system his choice of grouping in one locality all developer mixing units and grouping all fixer mixing units in an adjacent locality. Extra stores of the supply cartons may then conveniently be grouped near the respective mixing units.

Although the invention has been described in preferred forms with a certain degree of particularity, it is understood that the present disclosure of the preferred forms has been made only by way of example. Numerous changes in the details of construction and combination and arrangement of parts may be resorted to without departing from the spirit and the scope of the invention.

What is claimed is:

1. A fluid mixing system, comprising:

(a) a reservoir;

(b) a first fluid supply in communication with the reservoir, the first fluid supply including a container for carrying a plurality of vessels, the container having an opening associated with each vessel;

(c) a fluid release assembly disposed intermediate the first fluid supply and the reservoir, the fluid release assembly including a piercing assembly for puncturing the vessels to release the first fluid into the reservoir through the openings;

(d) a second fluid supply in communication with the reservoir and the fluid release assembly, the flow of the second fluid controlling operation of the fluid release assembly;

(e) a valve disposed intermediate the second fluid supply and the reservoir upstream of the fluid release assembly;

(f) a valve control to control the valve and therefore the flow of the second fluid to the fluid release assembly and the reservoir;

(g) a liquid level control means responsive to the level of fluid in the reservoir to activate the valve control when the fluid in the reservoir reaches a predetermined level; and (h) an interlock switch control means responsive to the presence of the first fluid supply to actuate the valve control when the vessels in the container contain a predetermined amount of fluid.

2. A chemical replenisher system for an X-ray film processor for mixing a developer chemical and a fixer chemical with water to produce a developer solution and a fixer solution to be dispensed to an X-ray film processor, comprising:

(a) a fixer tank structure;

(b) a developer tank structure;

(c) fixer supply means associated with the fixer tank structure for providing a predetermined quantity of prepackaged fixer chemical;

(d) developer supply means associated with the developer tank structure for providing a predetermined quantity of prepackaged developer chemical;

(e) fixer water input means connected to the fixer tank structure for coupling water under pressure to the fixer tank structure;

(f) developer water input means connected to the developer tank structure for coupling water under pressure to the developer tank structure;

(g) a fixer chemical release structure associated with the fixer supply means to release the fixer chemical to the fixer tank structure;

(h) a developer chemical release structure associated with the developer supply means to release the developer chemical to the developer tank structure; and (i) a control apparatus to control the operation of each chemical release structure, the control apparatus including an interlock mechanism actuated upon the presence of the supply means, the fixer interlock mechanism being actuated only when the fixer supply means is associated with the fixer tank structure and the developer interlock mechanism being actuated only when the developer supply means is associated with the developer tank structure.

3. The replenisher system of claim 2, the control apparatus further including a plurality of actuating members attached to the fixer and developer supply means for actuating the respective interlock mechanisms.

4. The replenisher system of claim 2, wherein each control apparatus further includes an indicator mechanism disposed within the tank structure and connected to the control apparatus for indicating the volume of solution in the tank structure, the water input means being actuated only when the interlock mechanism associated with the tank structure has been actuated and the indicator mechanism indicates that the volume of solution in the tank structure has decreased to a predetermined level.

5. The replenisher system of claim 4 wherein each water input means includes a control valve, and each valve is coupled to and controlled by the respective interlock and indicator mechanisms.

6. The replenisher system of claim 2 wherein each tank structure includes a support surface which engages the supply means and the interlock mechanism includes an actuating member which is engaged by the supply means.

7. The replenisher system of claim 6 wherein each supply means comprises:

(a) a container having a lower surface which engages the surface of the support, the lower surface having a plurality of spaced openings;

(b) a plurality of chemical-containing vessels disposed within the container and positioned in alignment with the openings; and (c) first and second actuating members disposed on the lower surface and spaced from each other.

8. A mixing system developer chemicals and fixed chemicals with water to produce fixer and developer solutions for a film processor, comprising:

(a) a plurality of fixer chemical supply units, each comprising a portable container within which a plurality of vessels are disposed, each vessel providing a predetermined quantity of a fixer chemical;

(b) a plurality of developer chemical supply units, each comprising a portable container within which a plurality of vessels are disposed, each vessel providing a predetermined quantity of a developer chemical;

(c) a plurality of mixing units for mixing the chemicals with water, each mixing unit including:

(i) a tank structure for supporting a supply unit;

(ii) water input means for directing water under pressure to the tank structure;

(iii) a chemical release assembly operated by the water for releasing chemical from the vessels of the supply unit to the tank structure; and (iv) control apparatus for operating the chemical release assembly and the water input means to provide a predetermined volume of mixed solution within the tank structure; and (d) the control apparatus of a plurality of like mixing units being interconnected for successively actuating the chemical release assemblies and water input means to provide and maintain concurrently one tank structure having a predetermined volume of fixer solution and another tank structure having a predetermined volume of developer solution, the tank structures supporting like chemical supply units having connected outlets.

9. The mixing system of claim 8 wherein:

(a) the control apparatus of each system includes supply indicator means secured to each mixing unit for engagement with the container to indicate when the vessels contain a predetermined quantity of chemical;

(b) a float switch mechanism is disposed within the tank structure to indicate the volume of mixed solution within the tank structure; and (c) a solenoid is coupled to the indicator means and the float switch mechanism to operate the water input means.

10. The mixing system of claim 9 wherein each chemical release assembly comprises a piercer assembly coupled to the water input means for piercing the vessels in response to the introduction of water from the water input means.

11. The mixing system of claim 10 wherein each chemical supply unit and associated mixing unit includes an interlock mechanism which allows only a fixer chemical supply unit to actuate a fixer chemical unit and a developer chemical supply unit to actuate a developer chemical mixing unit.

[12. A method of mixing fluids in a reservoir, comprising the steps of:

(a) providing a first fluid supply in communication with the reservoir under the influence of gravity;

(b) disposing a fluid release assembly intermediate the first fluid supply and the reservoir;

(c) providing a second fluid supply in communication with the reservoir, the fluid release assembly being disposed intermediate the second fluid supply and the reservoir;

(d) sensing the presence of a predetermined amount of fluid in the first fluid supply and in the reservoir; and thereafter (e) introducing fluid from the second fluid supply to the reservoir, the flow of the second fluid actuating the fluid release assembly to introduce fluid from the first fluid supply to the reservoir.]

[13. The method of claim 12, further including the step of agitating the fluids in the tank.]

[14. The method of claim 13, wherein the step of agitating comprises directing the second fluid into the reservoir as a rapidly moving stream.]

[15. The method of claim 12, wherein the step of introducing fluid from the second fluid supply is conditioned upon the mixed solution in the reservoir being below a first, predetermined level and upon the first fluid supply containing a predetermined volume of fluid.]

[16. The method of claim 15, further including the step of continuing the introduction of the second fluid into the reservoir until the mixed solution has reached a second, predetermined level.]

[17. The method of claim 12, wherein the step of providing a first fluid supply includes:

(a) disposing a first fluid in a vessel; and (b) positioning the vessel overlying the reservoir.]

18. [The method of claim 17, wherein the step of providing a first fluid supply also includes:] *A method of mixing fluids in a reservoir, comprising the steps of:*

*(a) providing a first fluid supply in communication with the reservoir under the influence of gravity; including:*

*i. disposing a first fluid in a vessel;*

*ii. positioning the vessel overlying the reservoir;*

[(a)] *iii.* disposing a container above the reservoir, the container having a plurality of openings; and

[(b)] *iv.* inserting a plurality of vessels into the container, each vessel being disposed adjacent an opening[.]*;*

*(b) disposing a fluid release assembly intermediate the first fluid supply and the reservoir;*

*(c) providing a second fluid supply in communication with the reservoir, the fluid release assembly being disposed intermediate the second fluid supply and the reservoir;*

*(d) sensing the presence of a predetermined amount of fluid in the first fluid supply and in the reservoir; and thereafter*

*(e) introducing fluid from the second fluid supply to the reservoir only if the predetermined amount of fluid in the supply is present, the flow of the second fluid actuating the fluid release assembly to introduce fluid from the first fluid supply to the reservoir.*

[19. The method of claim 17 wherein the step of introducing fluid from the second fluid supply is conditioned upon the vessel having a predetermined volume of fluid.]

20. [The method of claim 17 further including the step of] *A method of mixing fluids in a reservoir, comprising the steps of:*

*(a) providing a first fluid supply in communication with the reservoir under the influence of gravity, including:*

*i. disposing a first fluid in a vessel;*

*ii. positioning the vessel overlying the reservoir;*

*iii.* piercing the vessel to release the first fluid into the reservoir[.];

*(b) disposing a fluid release assembly intermediate the first fluid supply and the reservoir;*

*(c) providing a second fluid supply in communication with the reservoir, the fluid release assembly being disposed intermediate the second fluid supply and the reservoir.*

*(d) sensing the presence of a predetermined amount of fluid in the first fluid supply and in the reservoir; and thereafter*

*(e) introducing fluid from the second fluid supply to the reservoir only if the predetermined amount of fluid in the first fluid supply is present, the flow of the second fluid actuating the fluid release assembly to introduce fluid from the first fluid supply to the reservoir.*

21. The method of claim 20, wherein the step of piercing comprises advancing a piercer assembly into engagement with the vessel to puncture the vessel, the piercer assembly advancing in responce to flow of the second fluid.

22. In an X-ray film developing system, a method of mixing and maintaining a predetermined volume of mixed film developing and fixing solutions, comprising the steps of:

(a) providing a plurality of mixer units having commonly connected output lines, each unit having a storage tank of the predetermined volume;

(b) providing a prepackaged amount of a first fluid constituent for each mixer unit;

(c) supplying a second fluid constituent under pressure to each mixer unit;

(d) introducing a predetermined volume of the second fluid constituent into the storage tank of each mixer unit and introducing the prepackaged amount of the first fluid constituent into the storage tank for mixing with the second fluid constituent;

(e) depleting the mixed solution in each storage tank to a predetermined level; and (f) activating a second mixer unit to introduce into its storage tank a predetermined volume of the second fluid constituent and a prepackaged amount of the first fluid constituent.

23. The method of claim 22, including the step of activating in succession additional mixer units so that the volume of solution in at least one mixer unit stays above the predetermined level.

24. A mixing system for mixing first and second fluids to produce a mixed solution, comprising:

(a) first fluid supply means for providing a predetermined quantity of the first fluid; and (b) mixing means coupled to the first fluid supply means for mixing the first fluid with the second fluid to produce the mixed solution, the mixing means including:

(i) a reservoir for storing the mixed solution;

(ii) second fluid supply means for directing the second fluid under pressure to the reservoir;

(iii) a release assembly for releasing the first fluid into the reservoir;

(iv) support structure for supporting the first fluid supply means, the support structure including a surface having openings through which the release assembly operates and through which the first fluid is supplied to the reservoir; and (v) a spray head in communication with the second fluid supply means and disposed adjacent the support structure to rinse the support structure with the second fluid.

25. The mixing system of claim 24, further including control apparatus for operating the second fluid supply means to introduce the second fluid to the spray head substantially coincidentally with the actuation of the release assembly, thereby effecting premixing of the first and second fluids prior to their introduction into the reservoir.

26. The mixing system of claim 24, further including an agitator assembly disposed within the reservoir to agitate the first and second fluids.

27. The mixing system of claim 26, wherein the agitator assembly is in communication with the second fluid supply means and introduces the second fluid into the reservoir to cause the mixed fluids to swirl.

28. In a fluid mixing system for mixing first and second fluids in a reservoir, the system having a supply structure including a vessel in fluid communication with the reservoir for supplying the first fluid to the reservoir, a displaceable fluid release assembly disposed *below the vessel* within the reservoir and including a tubular member, the tubular member having a pointed end portion for piercing the vessel and releasing the first fluid, the end portion including a tip, a slicing edge portion, and a fold-over edge portion, the tip and slicing portions providing cutting edges to sever a portion of the vessel to form a discharge opening, the fold-over portion providing inefficient slicing to fold the severed portion to permit the severed portion to remain connected to the vessel by a link, whereby the first fluid is permitted to drain through the discharge opening *and through the tubular member* into the reservoir without the severed portion becoming entrained in the fluid flow.

29. The fluid mixing system of claim 28, wherein:

(a) the cutting edge of the slicing portion of each tubular member is inclined at a first, acute angle with respect to the longitudinal axis of the member when viewed from the side;

(b) the edge of the fold-over portion of each tubular member is inclined at a second, larger angle with respect to the longitudinal axis of the member when viewed from the side; and (c) each member when viewed from the front has a longitudinal slit near the pointed end and circumferentially spaced from the apex of the point for minimizing coring of the pierced vessel.

30. A fluid mixing system for mixing first and second fluids in a reservoir, the system having a supply structure for supplying the first fluid to the reservoir, and a fluid release assembly disposed within the reservoir, the release assembly including a plurality of hollow members to engage the supply structure to release the first fluid, the release assembly also including:

(a) a cylinder; and (b) a piston disposed within the cylinder and connected to the hollow members, the piston being acted upon by the second fluid to advance the hollow members into engagement with the supply structure.

31. The fluid mixing system of claim 30, wherein the cylinder includes an exit port to permit a portion of the second fluid to flow to the reservoir to agitate the fluid in the reservoir after the piston has advanced a predetermined distance.

32. The fluid mixing system of claim 30, further including a rinse mechanism coupled to the release assembly and disposed adjacent the supply structure and wherein the cylinder includes a bypass to permit a portion of the second fluid to flow to the rinse mechanism to premix the fluids after the piston has advanced a predetermined distance.

33. Film processing chemical mixing apparatus comprising:

(a) a chemical mixing structure defining developer and fixer mixing chambers;

(b) a developer supply structure defining a plurality of volumes each for containing a premeasured quantity of a different film developer constituent, the constituents to be mixed to provide a film developer solution;

(c) a fixer supply structure defining a plurality of volumes each for containing a premeasured quantity of a different film fixer constituent, the constituents to be mixed to provide a film fixer solution;

(d) each of the supply structures being positionable selectively in at least one predetermined dispensing orientation with respect to the mixing structure;

(e) developer enabling means forming a part of the apparatus and including portions forming parts of the chemical mixing and developer supply structures, the developer enabling means enabling the dispensing of developer constituents only when the developer structure is in at least one predetermined dispensing orientation;

(f) fixer enabling means forming a part of the apparatus and including portions forming parts of the chemical mixing and fixer supply structures, the fixer enabling means enabling the dispensing of fixer constituents only when the fixer structure is in at least one predetermined dispensing orientation; and (g) dispensing means carried by at least one of the structures and adapted to dispense developer and fixed constitutents from the developer and fixer structures into the respective developer and fixer mixing chambers when, but only when, enabled by the appropriate one of the enabling means, whereby to prevent the dispensing of fixer constituents into the developer mixing chamber and developer constitutents into the fixer mixing chamber.

34. Film processing chemical mixing apparatus comprising:

(a) a chemical mixing assembly including structure defining developer and fixer mixing chambers into which constituents of developer and fixer are mixed, respectively;

(b) a developer supply structure defining a plurality of volumes each for containing a premeasured quantity of a different film developer constituent, the constituents to be mixed in the developer mixing chamber to provide a film developer solution;

(c) a fixer supply structure defining a plurality of volumes each for containing a premeasured quantity of a different film fixer constituent, the constituents to be mixed in the fixer mixing chamber to provide a film fixer solution;

(d) each of the supply structures being positionable selectively in at least one predetermined dispensing orientation with respect to the mixing structure;

(e) fixer and developer constituent dispensing means forming a part of the apparatus and adapted to dispense developer and fixer constituents from the developer and fixer structures into the respective developer and fixer mixing chambers;

(f) a dispensing means actuation mechanism connected to the dispensing means for actuating the dispensing means whenever the dispensing of constituents is desired;

(g) coupling mechanism connected to at least one selected structure for connection of the selected structure to a water supply for supplying water for mixture with the constituents;

(h) means forming a part of the apparatus and adapted to cause constituents and water dispensed into the mixing chambers to be mixed to provide predetermined quantities of mixed fixer and developer solutions for delivery to a film processor; and (i) a delivery mechanism connected to the chemical mixing apparatus for delivery of mixed film processing chemicals.

35. Film processing chemical mixing apparatus comprising:

(a) a chemical mixing structure defining developer and fixer mixing chambers;

(b) the mixture structure including portions defining a space for support of a developer supply structure of a type defining a plurality of volumes each for containing a premeasured quantity of a different film developer constituent;

(c) the mixture structure including portions defining a space for support of a fixer supply structure of a type defining a plurality of volumes each for containing a premeasured quantity of a different film fixer constituent;

(d) condition-sensing means for sensing at least one chemical volume condition and emitting a constituent delivery signal; and (e) dispensing means carried by at least one of the structures and connected to the condition-sensing means, the dispensing means being adapted to dispense developer and fixer constituents from the developer and fixer structures into the respective developer and fixer mixing chambers when, but only when, enabled by a constituent delivery signal.

36. The apparatus of claim 35 wherein the condition sensed is the volume of fluid in one of the fluid mixing chambers.

37. The apparatus of claim 35 wherein the condition sensed is the presence of a supply structure.

38. A method of dispensing film processing chemicals, comprising the steps of:

(a) providing a chemical mixing structure defining developer and fixer mixing chambers;
(b) providing a developer supply structure of a type defining a plurality of volumes each for containing a premeasured quantity of a different film developer constituent;
(c) providing a fixer supply structure of a type defining a plurality of volumes each for containing a premeasured quantity of a different film fixer constituent;
(d) providing a dispensing means carried by at least one of the structures and adapted to dispense developer and fixer constituents from the developer and fixer structures into the respective developer and fixer mixing chambers;
(e) sensing at least one chemical volume condition; and
(f) emitting a constituent delivery signal to the dispensing means in response to the sensed condition to permit the developer and fixer constituents to be dispensed.

39. The method of claim 38, comprising the step of sensing the volume of fluid in any one of the fluid mixing chambers.

40. The method of claim 38, comprising the steps of sensing the presence of a supply structure.

41. A fluid mixing system, comprising:
(a) a reservoir;
(b) a plurality of vessels comprising a first fluid supply, each vessel containing fluid and adapted to release the contained fluid into the reservoir;
(c) a piercer assembly disposed intermediate the first fluid supply and the reservoir, the piercer assembly for piercing each vessel to release the fluid contained therein into the reservoir;
(d) a second fluid supply in communication with the reservoir and the piercer assembly, the flow of the second fluid controlling operation of the piercer assembly; and
(e) a valve disposed intermediate the second fluid supply and the reservoir to control the flow of the second fluid.

42. The fluid mixing system of claim 41 wherein the piercer assembly includes means for rinsing portions of the fluid mixing system with the second fluid.

43. A mixing system for producing a developer solution and fixer solution used in the processing of exposed X-ray film and having a developer mixing unit for mixing a developer chemical with water and a fixer mixing unit for mixing a fixer chemical with water, each mixing unit comprising:
(a) a reservoir;
(b) a supply means including a vessel for storing a predetermined amount of chemical and for providing the chemical to the reservoir;
(c) water input means for directing water under pressure to the reservoir and including control apparatus for controlling the flow of the water;
(d) a chemical release structure for releasing the chemical from the supply means into the reservoir and for directing the water into the reservoir, the release structure being actuated by the flow of water; and
(e) the control apparatus including a sensing means for engaging the supply means to sense the presence or absence of a chemical-containing vessel.

44. The mixing system of claim 43 wherein the supply means includes a plurality of vessels, and the chemical release structure engages the vessels to release the chemicals.

45. The mixing system of claim 44 wherein the supply means additionally includes a portable container within which the vessels are disposed, the container including a plurality of openings disposed adjacent the vessels through which chemical flows to the reservoir, the container also engaging the sensing means.

46. A fluid mixing system for mixing first and second fluids in a reservoir, the system having a supply structure including a vessel in fluid communication with the reservoir for supplying the first fluid to the reservoir, the system comprising:
(a) a displaceable fluid release assembly disposed within the reservoir and including a tubular member, the tubular member having a pointed end portion for piercing the vessel and releasing the first fluid, the end portion including a tip, a slicing edge portion, and a fold-over edge portion;
(b) the tip and slicing portions providing cutting edges to sever a portion of the vessel to form a discharge opening, the fold-over portion providing inefficient slicing to fold the severed portion to permit the severed portion to remain connected to the vessel by a link; and
(c) the fluid release assembly being connected to a pressurized supply of the second fluid and being advanced when in use in response to flow of the second fluid as the second fluid is introduced into the reservoir.

47. A fluid mixing system for mixing first and second fluids in a reservoir, the system having a supply structure including a vessel in fluid communication with the reservoir for supplying the first fluid to the reservoir, the system comprising:
(a) a displaceable fluid release assembly disposed within the reservoir and including a tubular member, the tubular member having a pointed end portion for piercing the vessel and releasing the first fluid, the end portion including a tip, a slicing edge portion, and a fold-over edge portion;
(b) the tip and slicing portions providing cutting edges to sever a portion of the vessel to form a discharge opening, the fold-over portion providing inefficient slicing to fold the severed portion to permit the severed portion to remain connected to the vessel by a link; and
(c) the release assembly including:
(i) a tubular member-supporting assembly connected at one end to a piston; and
(ii) a cylinder within which the piston reciprocates, the cylinder being in fluid communication with the second fluid and the piston being displaceable in response to the introduction of the second fluid into the cylinder.

48. A chemical replenisher system for an X-ray film processor for mixing a selected one of developer or fixer chemical with water to produce a solution to be dispensed to an X-ray film processor, comprising:
(a) a tank structure;
(b) chemical supply means associated with the tank structure for providing a predetermined quantity of prepackaged chemical;
(c) water input means connected to the tank structure for coupling water under pressure to the tank structure;

(d) a chemical release structure associated with the supply means to release the chemical to the tank structure;

(e) a control apparatus to control the operation of the chemical release structure, the control apparatus including an interlock mechanism actuated upon the presence of the proper supply means, the interlock mechanism being actuated only when the proper supply means is associated with the tank structure and the supply means contains an unused supply of chemical.

49. The replenisher system of claim 48, wherein the control apparatus further includes an indicator mechanism disposed within the tank structure and connected to the control apparatus for indicating the volume of solution in the tank structure, the water input means being actuated only when the interlock mechanism associated with the tank structure has been actuated and the indicator mechanism indicates that the volume of solution in the tank structure has decreased to a predetermined level.

50. The replenisher system of claim 48 wherein the tank structure includes a support surface which engages the supply means and the interlock mechanism includes an actuating member which is engaged by the supply means.

51. A mixing system for mixing film processing chemicals with water to produce a mixed solution, comprising:

(a) a chemical supply means defining a plurality of volumes each containing a predetermined quantity of chemical to be supplied;

(b) the supply means including a plurality of frangible diaphragms each at the bottom of a different volume when the chemical supply means is in use; and (c) mixing means coupled to the chemical supply means for mixing the chemicals with water to produce the mixed solution, the mixing means including:

(i) a reservoir for storing the mixed solution;

(ii) water supply means for directing the water under pressure to the reservoir;

(iii) a release assembly for releasing the chemicals into the reservoir; and (iv) support structure for supporting the chemical supply means, the support structure including a surface having openings through which the release assembly operates to break the diaphragms and through which the chemicals are supplied to the reservoir.

52. A mixing system for mixing photographic chemicals and water in a reservoir, the system having a supply structure including a plurality of vessels for supplying the chemicals to the reservoir, and a fluid release assembly disposed within the reservoir comprising:

(a) a plurality of hollow tubular members including portions adapted to engage and pierce the supply structure to release the chemicals;

(b) a cylinder; and (c) a piston disposed within the cylinder and connected to the hollow members, the piston being acted upon by *the* water under pressure to advance the hollow members into engagement with the supply structure.

53. The fluid mixing system of claim 52, wherein a water supply is connected to the cylinder and wherein a selected one of the water supply or the cylinder includes an exit port to permit a portion of the water to flow into the reservoir to agitate fluids in the reservoir.

54. The fluid mixing system of claim 52, further including a rinse mechanism coupled to the release assembly and disposed adjacent the supply structure, wherein a water supply is connected to the cylinder and wherein a selected one of the water supply or the cylinder includes a bypass to permit a portion of the water to flow to the rinse mechanism.

55. Film processing chemical mixing apparatus comprising:

(a) a chemical mixing structure defining a mixing chamber;

(b) a chemical supply structure defining a plurality of volumes each for containing a premeasured quantity of a different processing chemical constituent, the constituents to be mixed to provide a processing solution;

(c) the supply structure being positionable selectively in at least one predetermined dispensing orientation with respect to the mixing structure;

(d) enabling means forming a part of the apparatus and including portions forming parts of the chemical mixing and chemical supply structure, the enabling means enabling the dispensing of chemical constituents only when the supply structure is in at least one predetermined dispensing orientation; and (c) dispensing means carried by at least one of the structures and adapted to dispense constituents from the supply structure into the mixing chamber when, but only when, enabled by the enabling means, whereby to prevent the dispensing of the wrong chemical constituents into the mixing chamber.

56. Film processing chemical mixing apparatus comprising:

(a) a chemical mixing assembly including developer and fixer mixing chambers into which constituents of developer and fixer are mixed, respectively;

(b) a developer supply structure including a plurality of bottles each for containing a premeasured quantity of a different film developer constituent, the constituents to be mixed in the developer mixing chamber to provide a film developer solution;

(c) a fixer supply structure including a plurality of bottles each for containing a premeasured quantity of a different film fixer constituent, the constituents to be mixed in the fixer mixing chamber to provide a film fixer solution;

(d) each of the supply structures being positionable selectively in a predetermined dispensing orientation with the bottles inverted over the mixing chambers;

(e) fixer and developer constituent dispensing means forming a part of the apparatus and adapted to puncture bottle closing diaphragms to dispense developer and fixer constituents from the developer and fixer supply structures into the respective developer and fixer mixing chambers;

(f) a dispensing means actuation mechanism connected to the dispensing means for actuating the dispensing means whenever the dispensing of constituents is desired;

(g) coupling mechanism for connecting the mixing assembly to a water supply for supplying water for mixture with the constituents;

(h) means forming a part of the apparatus and adapted to cause constituents and water dispensed into the mixing chambers to be mixed to provide predetermined quantities of mixed fixer and developer solutions for delivery to a film processor; and (i) a delivery mechanism connected to the chemical mixing apparatus for delivery of mixed film processing chemicals.

57. In a fluid mixing system for mixing first and second fluids in a tank structure, the system having a supply structure operably associated with the tank structure for supplying the first fluid, the improvement comprising an advanceable fluid release assembly mounted within the tank structure and having one or more hollow members engaging the supply structure for releasing the first fluid, the release assembly having:

(a) a cylinder having walls which define a bore;

(b) a piston within the bore and being operable by the second fluid for advancing the members into engagement with the supply structure; wherein (c) the cylinder defining the bore has a first portion with relatively small cross-sectional dimension toward one end and a second portion with a relatively larger cross-sectional portion having at least one exit port in its walls to thereby provide passage of the second fluid through the cylinder into the tank structure.

* * * * *

UNITED STATES PATENT AND TRADEMARK OFFICE

CERTIFICATE OF CORRECTION

PATENT NO. : RE 30610

DATED : May 12, 1981

INVENTOR(S) : Leonard W. Gacki and Robert E. Daly

It is certified that error appears in the above-identified patent and that said Letters Patent are hereby corrected as shown below:

Column 8, lines 59 and 60, change "preselected necks 45. The configurations preferably..." to --preselected configuration. The necks 45 perferably...--

Signed and Sealed this

*Twenty-seventh* Day of *October 1981*

[SEAL]

*Attest:*

GERALD J. MOSSINGHOFF

*Attesting Officer*

*Commissioner of Patents and Trademarks*

REEXAMINATION CERTIFICATE (200th)

United States Patent [19]

Gacki et al.

[11] B1 Re. 30,610

[45] Certificate Issued Jun. 5, 1984

[54] FLUID MIXING AND DISPENSING SYSTEM

[75] Inventors: Leonard W. Gacki, White Plains; Robert E. Daly, Farmingdale, both of N.Y.

[73] Assignee: Picker Corporation, Cleveland, Ohio

Reexamination Request:
No. 90/000,370, May 5, 1983

Reexamination Certificate for:

| | |
|---|---|
| Patent No.: | **Re. 30,610** |
| Issued: | **May 12, 1981** |
| Appl. No.: | **10,812** |
| Filed: | **Sep. 3, 1975** |

Related U.S. Patent Documents

Reissue of:

| | |
|---|---|
| [64] Patent No.: | **4,103,358** |
| Issued: | **Jul. 25, 1978** |
| Appl. No.: | **609,957** |
| Filed: | **Sep. 3, 1975** |

[51] Int. Cl.[3] ..... B01F 15/02; B01F 15/04

[52] U.S. Cl. ..... 366/153; 137/101.27; 222/86; 354/323; 366/167; 366/177

[58] Field of Search ..... 366/153, 152, 132, 150, 366/151, 160, 162, 167, 177; 137/101.25; 222/80, 545, 82, 83, 86, 83.5, 129.3, 129.4, 129.2; 141/9, 100–107; 354/323

[56] References Cited

PUBLICATIONS

Picker Cadi, Picker Corporation, Cleveland Ohio, Cadi Brochure (date unknown).

Business Research Services, Inc., Cadi Questionaire, Jul. 1974.

Advance Information Bulletin, Hunt HD-73 Chemistry and Optional HD-73 Automatic Replenishment System, late 1972.

Kodak Research Disclosure, Oct. 1973, Dispensing Apparatus 11440.

*Primary Examiner*—Robert W. Jenkins

[57] ABSTRACT

A fluid mixing system and method is disclosed for automatically mixing precise concentrations of photographic processing chemistry to be used in an X-ray film processor. The system produces a fresh batch of mixed solution whenever a previous batch has been reduced to a predetermined minimum volume. A pair of substantially identically constructed mixing units are provided to produce both developer and fixer solutions for film processing. Each unit has: a chemical supply structure for supplying chemicals from containerized supplied; a storage and mixing tank structure which underlies the chemical supply structure and defines a reservoir for mixing the chemistry with water; a water input valve for selectively introducing water under pressure into the tank structure; control apparatus for conditionally controlling operation of the water valve; and a chemical release assembly which is coupled to and actuated by the water valve. The chemical release assembly is operated by the pressure of the water as the water is admitted through the water valve. Operation of the release assembly causes piercing of the containers, allowing the chemistry to drain into the reservoir. The pressurized water creates a swirl for agitating and thoroughly mixing the chemistry and the water.

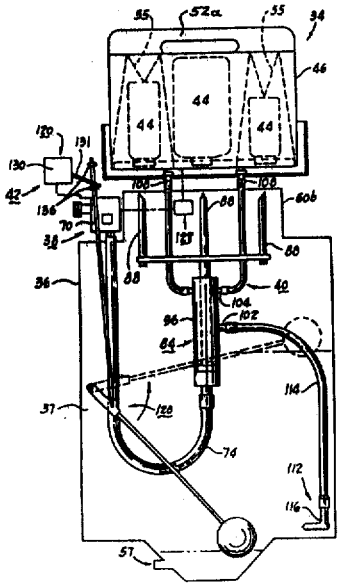

REEXAMINATION CERTIFICATE ISSUED UNDER 35 U.S.C. 307.

THE PATENT IS HEREBY AMENDED AS INDICATED BELOW.

Matter enclosed in heavy brackets [ ] appeared in the reissue patent, but has been deleted and is no longer a part of the reissue patent; matter printed in italics indicates additions made to the reissue patent.

AS A RESULT OF REEXAMINATION, IT HAS BEEN DETERMINED THAT:

The patentability of claims 1–11, 18, 20–50, and 52–57 is confirmed.

Claims 12–17 and 19 were previously cancelled.

Claim 51 is determined to be patentable as amended:

51. A mixing system for mixing film processing chemicals with water to produce a mixed solution, comprising:

(a) a chemical supply means defining a plurality of volumes each containing a predetermined quantity of chemical to be supplied;

(b) the supply means including a plurality of frangible diaphragms each at the bottom of a different volume when the chemical supply means is in use; and (c) mixing means coupled to the chemical supply means for mixing the chemicals with water to produce the mixed solution, the mixing means including:

(i) a reservoir for storing the mixed solution;

[(ii) water supply means for directing the water under pressure to the reservoir;]

[(iii)] *(ii)* a release assembly for releasing the chemicals into the reservoir; [and,]

*(iii) water supply means for directing the water under pressure to the reservoir and including structure operative to introduce water into the reservoir prior to release of substantial portions of said quantities of chemicals and being further operative to introduce additional water after said chemicals are substantially completely released to effect mixing of the chemicals with one another and the water; and,*

(iv) support structure for supporting the chemical supply means, the support structure including a surface having openings through which the release assembly operates to break the diaphragms and through which the chemicals are supplied to the reservoir.

* * * * *